Oct. 8, 1929.  F. L. ZYBACH  1,731,220
AUTOMATIC TRACTOR GUIDE
Filed Aug. 8, 1927   3 Sheets-Sheet 1
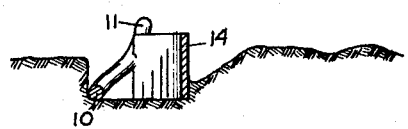
Fig. 2A
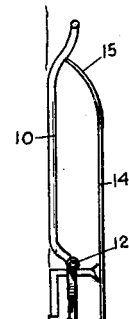
Fig. 1
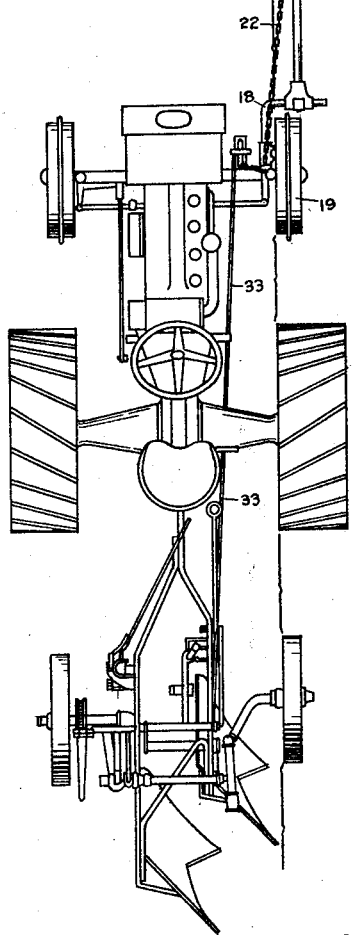
Inventor
Frank L. Zybach
By Emil F. Lange
Attorney Oct. 8, 1929. F. L. ZYBACH 1,731,220
AUTOMATIC TRACTOR GUIDE
Filed Aug. 8, 1927 3 Sheets-Sheet 2
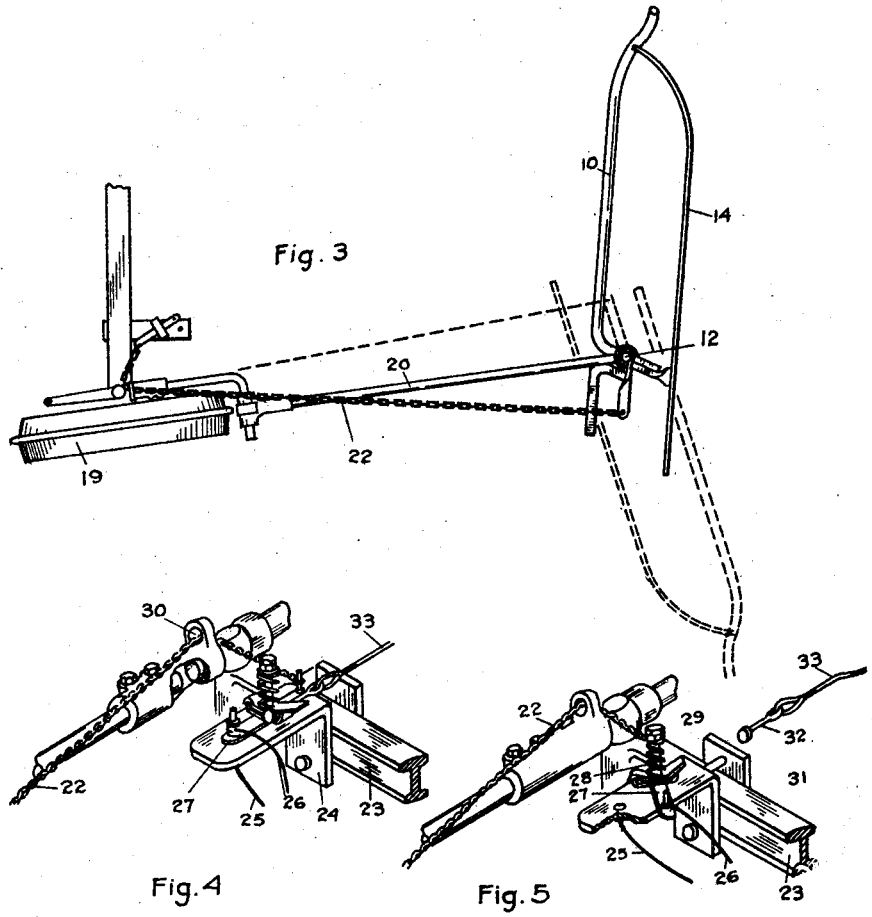
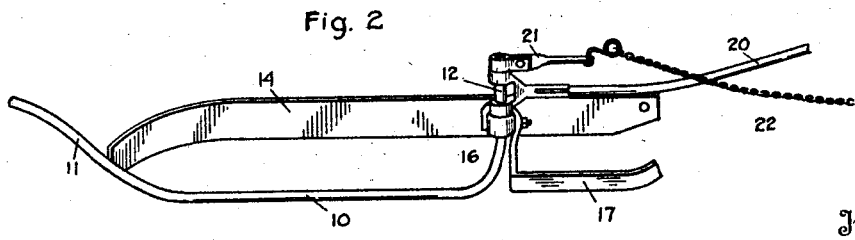
Inventor
Frank L. Zybach

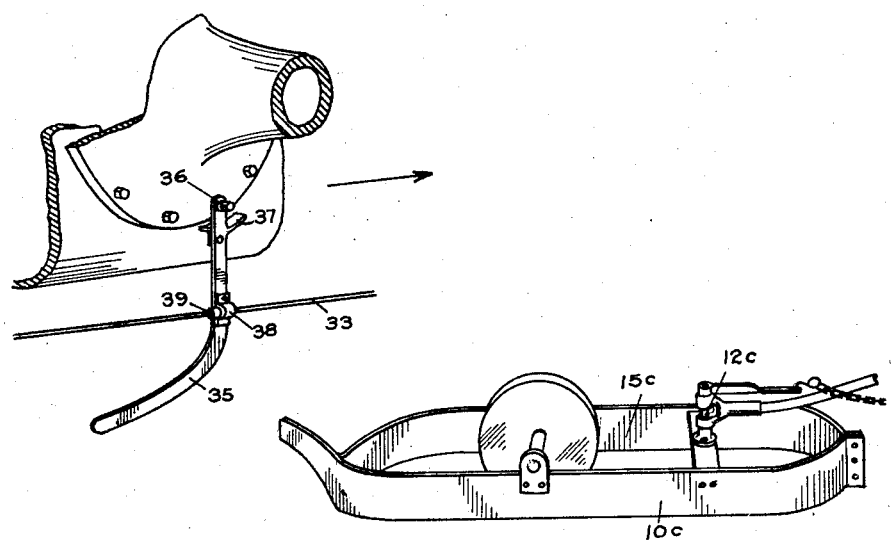
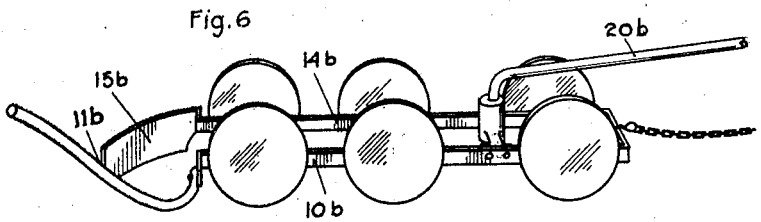
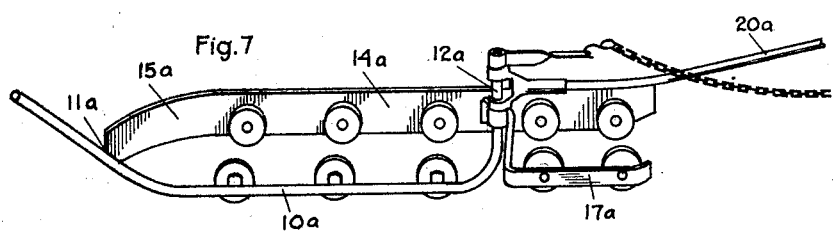

Patented Oct. 8, 1929

1,731,220

UNITED STATES PATENT OFFICE

FRANK L. ZYBACH, OF GRAND ISLAND, NEBRASKA, ASSIGNOR TO CHASE PLOW COMPANY, A CORPORATION OF NEBRASKA

AUTOMATIC TRACTOR GUIDE

Application filed August 8, 1927. Serial No. 211,500.

The present invention relates to automatic tractor guides and it is in the nature of an improvement on the device disclosed in my prior Patent No. 1,390,419, granted September 13, 1921.

The primary object of my invention is the provision of an attachment which may be secured to any tractor to make the tractor entirely automatic, so that the "manless tractor" will require only fueling and oiling to keep it in operation.

One of the main objects of the invention is the provision of a pilot device which is so constructed and designed that it will remain in the furrow except under the most unusual conditions.

Another important object of the invention is the provision of a pilot device which actuates the steering mechanism of the tractor when the pilot device is in the furrow but which is independent of the steering mechanism when the pilot device is out of the furrow.

A fourth object of the invention is the provision of connections whereby the pilot device actuates an engine control without the intervention of the steering mechanism of the tractor.

A fifth object of the invention is the provision of certain improved constructions for breaking the circuit of the ignition system of the tractor engine.

Still another object of the invention is the provision of a member which will automatically stop the tractor engine when the tractor wheels sink into the soil to a predetermined depth.

Having in view these objects and others which will be pointed out in the following description, I will now refer to the drawings, in which Figure 1 is a plan view of a tractor drawing a plow gang, my novel pilot device being secured to the tractor.

Figure 2 is a view in perspective of the pilot device.

Figure 2ᴬ is a cross sectional view of a portion of the field through the furrow occupied by the pilot member.

Figure 3 is a plan view showing one of the steering wheels of the tractor and showing the pilot device in two angular positions either of which it may assume when it is out of the furrow.

Figure 4 is a view in perspective of the mechanism for breaking the circuit, the parts being shown in the position which they occupy when the circuit is closed.

Figure 5 is a perspective view of the parts shown in Figure 4 but showing the parts in the position which they occupy immediately after the breaking of the circuit.

Figure 6 is a perspective view of a modified form of the pilot member in which the plate and rod of the Figure 2 form are replaced by wheels or rollers.

Figure 7 shows in perspective another form of the pilot and showing how the plate and rod may be supported on rollers or wheels.

Figure 8 is a perspective view of the pilot in another modified form.

Figure 9 is an illustration showing the depth regulating lever for stopping the engine when the tractor wheels dig too deeply into the soil.

The pilot device includes a rod made from shafting or tubing or other similar material. It includes a main portion 10 which is designed to ride in the furrow and against the landside wall of the furrow. Its forward end is turned away from the landside wall of the furrow so as to be upwardly and forwardly inclined, and its rear end is also turned away from the landside wall of the furrow and then vertically in an upward direction. A plate of relatively wide sheet metal is secured at its forward end to the rod at or near the bend 11 and in its rear it is secured by means of a strap 13, the sheet metal plate projecting rearwardly beyond its connection with the strap 13. The sheet metal plate 14 consists of two portions, the main being parallel to the forward portion 10 of the rod and the portion being curved to meet the rod at the bend 11. The sheet metal plate 14 is arranged in vertical position or substantially so. The portion 12 of the rod is provided with a fixed or adjustable collar 16 and the portion above the collar serves as a pivot on which the pilot is adapted to swing. The axis 12 is inclined upwardly and rearwardly at a slight angle.

As is well known to plow men, the plow furrow is bounded by a vertical wall on the landside and an inclined wall on the side of the plowed ground, the plow sole being substantially horizontal. The plow sole frequently has a groove adjacent the landside of the furrow, this groove being formed by the point of the plow which usually projects slightly below the sole of the plow. The pilot device is so designed that the portion 10 of the rod bears against the lower portion of the vertical wall at the landside of the furrow and that it rides in the groove when there is one. Its length is sufficient to prevent the turning of the pilot in the furrow and about the pivot 12. The plate 14 is adjacent the inclined wall of the furrow and the soil which falls into the furrow from the furrow slice is directed against the plate 14 so that there is a constant thrust on the pilot toward the landside of the furrow. This thrust is greatest at the forward end of the pilot and the tendency of the thrust at the forward end is to swing the pilot about the pivot 12 toward the landside of the furrow. The tendency of this thrust is to force the portion 10 of the pilot toward and to maintain it in its operative position against the landside wall of the furrow. Clods sometimes drop into the furrow from either wall but the shape of the forward end of the rod is such that these clods are readily deflected either into the space between the portions 10 and 14 or to the right of the portion 14. Clods falling from the left wall of the furrow near the forward end of the pilot are apt to produce a thrust tending to swing the pilot to the right about the pivot 12 and for this reason there is provided a rudder 17 projecting rearwardly from the pilot and in line with the portion 10. Since this rudder is in the rear of the pivot 12 and since it bears against the landside furrow wall, its tendency is to resist the turning of the pilot toward the right about the pivot 12.

Numerous variations and modifications are possible in the design of the pilot as above described. Merely by way of illustration, I have shown in Figures 6, 7 and 8, three modifications which embody the novel principles of the pilot shown in Figure 2 but which employ somewhat different structural elements. In Figure 6 the two frame members $10^b$ and $14^b$ correspond in position with the members 10 and 14 of Figure 2. The member $11^b$ projects from the member $10^b$ in a forwardly and inwardly direction and it is secured to the member $15^b$ which projects forwardly and inwardly from the member $14^b$. A pivot member is secured between the members $10^b$ and $14^b$ toward the rear extremity of the pilot and this pivot member receives the downturned end portion of the rod $20^b$ which corresponds in function to the rod 20 of Figure 2. In this construction the downturned forward end portion of the rod $20^b$ serves as the pivotal axis. The frame parts $10^b$ and $14^b$ are supported on disks. In Figure 7 the rod $10^a$ corresponds throughout to the rod 10 of Figure 2, having a forwardly, inwardly and upwardly curved portion $11^a$ where it is secured to the portion $15^a$ of the plate $14^a$. At its rear end the rod $10^a$ is turned upwardly and slightly to the rear to form the pivotal axis $12^a$ to which is secured the rod $20^a$. The frame parts $10^a$ and $14^a$ and also the rudder $17^a$ are supported on small disks or rollers. In Figure 8 the frame portion 10 of Figure 2 is replaced by a plate or strap $10^c$ which is similar in form and function to the frame portion 10. The strap or plate $15^c$ is connected at two spaced points to the strap or plate $10^c$. A single disk or wheel is shown as a support for the pilot in Figure 8, the disk or wheel being journalled on an axle which is supported between and by the straps $10^c$ and $15^c$. The pivot member $12^c$ is also supported by and between the straps $10^c$ and $15^c$, being positioned toward the rear extremity of the pilot. The three modifications shown are, however, merely illustrative of a large number of other variations of which the present invention is susceptible.

In securing the pilot to the tractor, the tractor is provided with a forwardly and outwardly projecting L-shaped arm 18 which is so secured to the tractor that it governs the steering movement of the steering wheel 19 of the tractor. The transverse portion of the arm 18 is forward of the steering wheel 19. The rod 20 is pivotally connected to the transverse portion of the arm 18 so that the rod 20 has up and down movements but is held against any horizontal movement. In other words, the rod 20 is rigidly held in vertical alignment with the steering wheel 19. It should be understood, however, that the drawings in the present instance disclose a tractor of which the wheels on the right-hand side travel in the previously formed furrow. In the case of tractors which travel entirely on the unplowed ground, the horizontal portion of the arm 18 is extended to a suitable distance and the arm 20 is then secured so that it will be in alignment with the previously formed furrow. At its forward end the arm 20 is pivotally secured to the portion 12 of the pilot.

It will be apparent that so long as the pilot is in the furrow, no pivotal movement can occur about the point 12 except possibly very slight movements due to obstructions and irregularities in the furrow. Such slight movements will, however, not affect the steering, and it is only when the movements become great enough to shift the pivot 12 in a lateral direction that the movement is communicated to the steering wheels of the tractor. When turning corners the movement may be either to the left or to the right but because of the construction of the pilot the pivotal point 12 and the forward end of the arm 20 must always be positioned in the furrow except when the pilot leaves the furrow. In other words, the forward end of the arm 20 must follow the furrow and in doing so it must actuate the steering mechanism through the arm 18 to follow all departures from the straight line in the furrow.

In the event that the pilot should for any reason leave the furrow, the thrust will be such that the pilot will swing about its pivot 12. This is true regardless of how smooth or how rough the surface of the soil is. Since the greater portion of the pilot is forward of the pivot, it will not be held in alignment with the rod 20 unless it is held in contact with furrow walls. At the same time no force is exerted by the pilot which would tend to move the steering wheels and except for the irregularities of the surface of the soil as to affect the steering wheel 19 itself, the tractor itself would move in a forward direction in a straight line until stopped. Because of this fact the movement of the pilot about its pivot 12 is very rapid and this movement may continue until the pilot is reversed in position about its pivot.

Secured to the pilot and to move pivotally therewith is a rearwardly projecting arm 21 having a flexible connection 22 which may lead to any desired engine control. The result is that when the pilot leaves the furrow, the pilot is rapidly swung about its pivot 12 immediately after leaving the furrow and that the flexible member 22 is thus tensioned to stop the tractor. Figures 2, 6, 7, and 8 also illustrate some of the variations in the manner of attaching the chain 22. It is obvious that the chain may be attached in any manner so that it will be subjected to tension when the pilot swings on its axis. In Figures 2, 7, and 8 the chain is secured to a rearwardly projecting arm but in Figure 6 the chain is secured directly to the pilot at its rear extremity where it is subjected to the same tension when the pilot is swung about on its axis. The specific means for stopping the tractor will now be described.

Secured to the tractor beam 23 is a bracket 24 having a make and break connection for the ignition circuit. The terminal 25 of this circuit has a contact point on the bracket 24 and the terminal 26 has its contact point on a movable lever 27 which is pivoted to the bracket 24. The lever 27 is held with its terminal 26 in contact with the terminal 25 by means of the pressure spring 28 surrounding the pin of the lever 27, this spring being adjustably tensioned by means of a nut 29. The rear extremity of the lever 27 is connected to the flexible member 22 which passes through certain guiding members as that shown at 30. It will readily be seen that tension on the member 22 will swing the lever 27 out of its operative position into the position shown in Figure 5 to break the circuit and to thus stop the engine. The lever 27 has secured thereto and transversely thereof a clip 31 which is also held in its operative relation by the spring 28. The clip 31 is adapted to engage the head of a pin 32 which is connected through a flexible member 33 to the plows in a manner fully described in my prior Patent No. 1,390,419. The purpose of this connection is similar to that of the corresponding construction of the Zybach patent. When the plows become obstructed with trash or are otherwise rendered inoperative, tension will be exerted through the flexible member 33 to swing the clip and with it the lever 27 about its pivot to break the ignition circuit, and the parts will remain in the position shown in Figure 5 until restored by the operator. In this particular detail a break joint connection is provided to take the place of the connection shown in my prior patent which is objectionable in that the flexible member itself is apt to be broken when the plows become detached.

The construction shown in my prior patent took care of all difficulties in plowing except one. In soft soil the tractor wheels are apt to sink into the soil and to spin without propelling the tractor, thus digging in deeper and deeper. For this reason I have provided means cooperating with the other features of my invention for stopping the engine of the tractor when the tractor wheels sink into the soil to a predetermined distance. As shown in Figure 9 the shoe 35 is pivotally secured at 36 to the rear axle housing of the tractor, the securing means being one of the bolts which secure the axle housing in place. The shoe is rearwardly and downwardly inclined with reference to the normal movement of the tractor so that when the wheels sink into the ground a distance such that the shoe engages the surface of the soil, the shoe will be swung rearwardly on its pivot. The shoe is provided with a stop 37 for limiting its movement. The shoe is also provided with an aperture at 38 for receiving the cable or other flexible member 33 which connects the plows to the make and break connection shown in Figures 4 and 5. This cable has secured thereto a button or knot 39 and it will be obvious that the rearward movement of the shoe 35 will draw the cable 33 rearwardly to break the circuit.

The specific engine control is, however, illustrated and described merely for the purpose of showing one specific embodiment of this feature of the invention. Connections could be made by means of the flexible connection 22 with the carburetor or clutch of the engine or in case a steam tractor were employed the connections could be made to any operative part of the steam engine in such a manner as to stop the engine when tension is applied to either of the flexible members 22 or 33. The important features of the invention reside very largely in the design and construction of the pilot member itself, in the relation of the pilot member to the supporting arm 20 and in the direct connection between the pilot member and the engine control whereby the pilot member may stop the engine without the intermediacy of the steering mechanism so that the tractor may travel in a straight forward direction until its engine is stopped by the direct action of the pilot member.

Attention is directed particularly to the form and structure of the pilot member, to the relation of the pilot member to the steering arm 20 and to the relation of the steering arm 20 to the steering mechanism of the tractor. The various details of construction of the pilot member are, of course, designed with special reference to the form and structure of the plow furrow. The form of the pilot member is such that it cannot turn within the furrow and that it must be out of the furrow if it assumes an angular relation of any extent with the steering arm 20. The pilot member is normally pushed by the steering arm 20 and since the pivot between the two is in the rear portion of the pilot member, the pilot member will be instantly swung through a wide arc unless it is held substantially in alignment with the steering arm as is the case when the pilot member is in the plow furrow. The steering arm 20 is in fact a portion of the steering mechanism of the tractor as it is merely a lever whereby the steering mechanism of the tractor may be actuated. It thus functions both to push the pilot and to actuate the steering mechanism of the tractor when its forward end becomes laterally displaced. Such lateral displacement can occur only in response to the variations in direction of the plow furrow. When the pilot member is outside the furrow it will have no appreciable effect on the steering arm and the tractor would normally continue to travel in a straight line if the steering wheels and the traction wheels are in alignment or in a circle if the steering wheels and the traction wheels are out of alignment. The tractor would, however, be stopped within a few inches of travel if the pilot were swung about its axis 12.

The arrangement described permits of a certain degree of adjustment. Due to the width of some plow furrows and due to the obstructions in the furrows there is normally a certain slight degree of movement of the pilot member about its pivot 12 as is also the case when the furrow turns a corner. The flexible member has sufficient slack so that the slight angular variation between the pilot member and the steering arm does not affect the engine control. By altering the connection between the flexible member 22 and the arm 21 so as to lengthen or shorten the flexible connection it is possible to adjust the device for any permissible variation. Similar adjustment might be provided in the connection between the cable and the make and break device for the ignition circuit.

Having thus described my invention in such full, clear, and exact terms that its construction and operation will be readily understood by others skilled in the art to which it pertains, what I claim as new and desire to secure by Letters Patent of the United States is:

1. In combination, a steering arm adapted to be secured in rigid steering relation with a steering member of a tractor, a pilot secured in castering relation to said steering arm and adapted to ride in a furrow, the castering axis of said pilot being positioned in the rear portion thereof whereby said pilot will swing about its castering axis when it is out of the furrow.

2. In combination, a steering arm adapted to be secured in rigid steering relation with a steering member of a tractor, a pilot secured in castering relation to said steering arm and adapted to travel in a furrow and to be held by the walls of the furrow from leaving the furrow, said pilot having a length greater than the width of the furrow the castering axis of said pilot being positioned in the rear portion thereof whereby said pilot will swing about its castering axis when it is out of the furrow, and a rudder on said pilot.

3. In combination, a steering arm adapted to be secured to a tractor and to be held rigidly against movement except in a vertical plane, and a pilot member secured in castering relation to the free extremity of said steering arm, said castering pilot being so shaped and dimensioned relative to the furrow that it is prevented from turning on its castering axis while in the furrow.

4. A pilot member adapted to be secured to a tractor and to travel in a furrow for guiding the travel of the tractor, said pilot member being shaped and dimensioned relative to the furrow so as to be held in the furrow by the walls thereof during the travel of the tractor, a castering axis for said pilot member at the rear thereof, means at the forward extremity of said pilot member for deflecting clods of soil, and a rudder on said pilot member, said rudder being positioned rearwardly of said castering axis.

5. In combination, a castering pilot which is adapted to ride in a furrow and which is held against castering movement while in the furrow, means for supporting said pilot on a tractor, and other means connecting said pilot to the tractor for automatically stopping the travel of the tractor when said castering pilot swings about its castering axis through a predetermined arc.

6. In combination with a tractor provided with a source of power and control means therefor, steering mechanism, a pilot device connected with said steering mechanism and adapted to travel in a furrow and to be held from turning by contact with a wall thereof, and a direct connection from said pilot device to the power control means of the tractor adapted to be actuated by said pilot device independently of said steering mechanism to stop the travel of the tractor when said pilot device leaves the furrow.

7. An attachment for a tractor, said attachment including a steering arm adapted to be secured in rigid steering relation to the steering mechanism of the tractor, a pilot member, a vertical pivot connecting said pilot member to said steering arm, and means for directly connecting said pilot member to the control means of the tractor whereby the travel of the tractor will be automatically stopped without affecting the steering mechanism of the tractor when said pilot member is swung about its pivotal connection with said steering arm.

8. An attachment for a tractor, said attachment including a steering arm adapted to be secured in rigid steering relation to the steering mechanism of the tractor, a pilot member adapted to travel in a furrow, a vertical pivot connecting said steering arm to the rear portion of said pilot member whereby said pilot member will be turned rapidly on its pivot when it is out of the furrow, and means for directly connecting said pilot to a control means of the tractor for automatically stopping the travel of the tractor without affecting the steering mechanism of the tractor when said pilot member is swung on its pivot.

9. An attachment for a tractor including a steering arm adapted to be secured in rigid steering relation to the steering mechanism, a pilot member adapted to travel in a furrow and having a pivotal relation about a vertical axis with said steering arm, said pilot member being shaped and dimensioned so that it will be held from turning by the walls of the furrow, the arrangement being such that the steering arm serves as a push rod for said pilot member and said pilot member guides the forward extremity of said steering arm to follow the lateral variations of the furrow, the pilot member being rapidly turned on its axis under the thrust of said steering arm when said pilot member leaves the furrow, and means for directly connecting said pilot to a control means of the tractor for automatically stopping the travel of the tractor without affecting the steering mechanism of the tractor when said pilot member is swung on its pivot.

In testimony whereof I affix my signature.

FRANK L. ZYBACH.